United States Patent [19]
DeLeon

[11] Patent Number: 5,927,686
[45] Date of Patent: Jul. 27, 1999

[54] SOUND DAMPENING DUCT DAMPER

[76] Inventor: Arthur P. DeLeon, 2179 Fitzgerald Rd., Simi Valley, Calif. 93065

[21] Appl. No.: 09/093,070

[22] Filed: Jun. 8, 1998

Related U.S. Application Data

[63] Continuation-in-part of application No. 08/813,661, Mar. 7, 1997, Pat. No. 5,813,430.
[51] Int. Cl.⁶ .................................................... F16K 1/22
[52] U.S. Cl. ......................................... 251/305; 251/306
[58] Field of Search ..................................... 251/305, 306

[56] References Cited

U.S. PATENT DOCUMENTS

| 3,377,047 | 4/1968 | Scholl | 251/306 X |
| 4,759,530 | 7/1988 | Iff | 251/306 |

Primary Examiner—John Fox
Attorney, Agent, or Firm—Jack C. Munro

[57] ABSTRACT

A damper apparatus which includes a rigid frame mounted on an elongated rod. A sheet material flexible cover closely covers the frame. The frame, cover and elongated rod are inserted within a duct with the ends of the elongated rod protruding through the wall of the duct. The covered frame can be pivoted exteriorly of the duct by pivoting of the elongated rod to any desired position and be caused to remain in that position functioning to restrict the flow of gas through the duct. The flexible cover functions as a sound damper for mounting the sound that is created by moving of the gas through the duct.

11 Claims, 2 Drawing Sheets

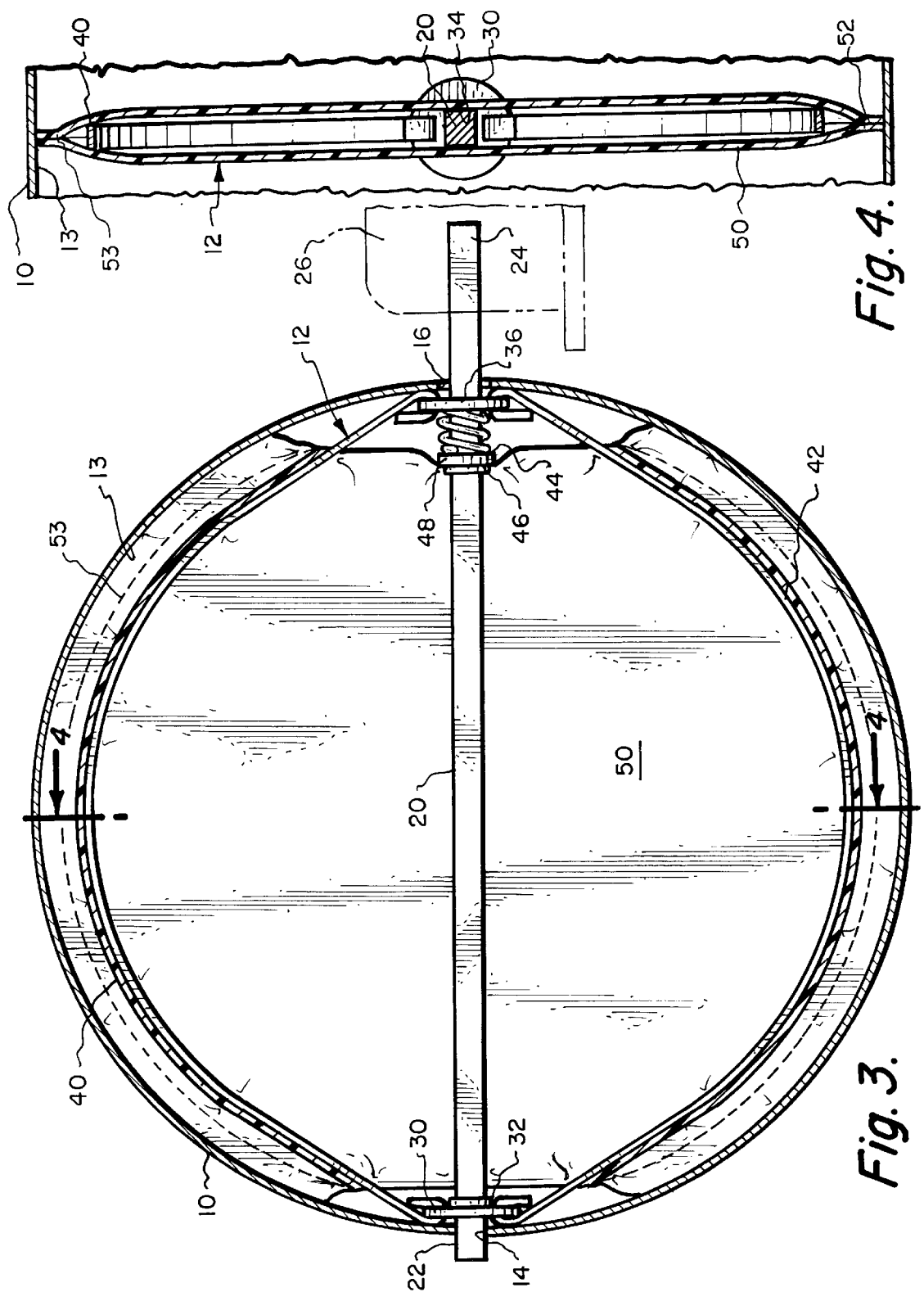

SOUND DAMPENING DUCT DAMPER

REFERENCE TO PRIOR APPLICATION

This application is a continuation-in-part of U.S. patent application Ser. No. 08/813,661, filed Mar. 7, 1997, entitled ADJUSTABLE DUCT DAMPER by the present inventor, now U.S. Pat. No. 5,813,430

BACKGROUND OF THE INVENTION

1) Field of the Invention

The present invention relates to duct dampers, and more particularly to a sound absorbing duct damper capable of providing a variable restriction to a gas flowing through a duct.

2) Description of Prior Art

The subject matter of the present invention is going to be described in relation to an air duct. However, it is considered to be within the scope of this invention that this invention could be used in ducts within which flow other types of gases. It is not considered possible to use the present invention within liquid flowing ducts.

Ventilation in homes and buildings requires that air be circulated and distributed according to the requirements of the different parts of the home or building. The airflow into a room of a home or building depends upon (1) it's proximity to the source of the airflow, (2) the cross-sectional area of the ventilation duct connecting to the room and (3) the position of the room relative to the sun (whether the sun gets the afternoon sun or the morning sun). The flow rates of air into different rooms are controlled by way of dampers. These dampers are installed within the duct work. The dampers are used to vary the airflow to each individual room so that each room of the home or building receives the desirable amount of heating or cooling.

When a home or building is being constructed, an air conditioning contractor installs the duct work, and at the same time installs the damper at the particular location within the duct work. Typically, the damper is fabricated at the site. Fabrication occurs by the air conditioning contractor cutting a section of sheet metal which somewhat conforms to the interior of the duct so that if this section of sheet metal is located precisely transverse within the duct, the airflow will be substantially closed. This section of sheet metal is mounted on a pair of diametrically lined fasteners with each fastener to protrude through a hole in the sidewall of the duct. Movement of this section of sheet metal is controlled by physically pivoting of the fasteners on which the sheet metal is mounted which will cause this section of sheet metal to move to various angular positions within the duct. If this section of sheet metal is positioned in substantial axial alignment within the duct, essentially no restriction of the airflow occurs.

This type of fabrication of a damper has many disadvantages. The fabrication procedure is quite time consuming. Air conditioning contractors are normally paid between twenty-five and fifty dollars an hour, and if it takes a couple of hours to manufacture and install such a damper, then that damper becomes quite expensive. Also, such fabricated type of dampers frequently "chatter" as the air is moved past the damper. This "chatter" is caused by the rush of air past the damper causing the damper to vibrate. This vibration produces a high-pitched sound which is exceedingly undesirable to most people.

Also, the installation procedure of such a fabricated damper is rather difficult and also a time consuming procedure. Many times the fabrication produces a section of sheet metal that just doesn't quite fit within the duct, either being too tight, which requires modification, or it's too loose which is not capable of completely restricting of the airflow if total air restriction is desired. Also, such fabricated type of dampers do not adjust easily and frequently bind during the adjusting process.

SUMMARY OF THE INVENTION

The primary objective of the present invention is to construct a damper apparatus that is intended to be installed during installation of the duct work within a house or building, with the damper apparatus being installed quickly and easily minimizing time spent by the installer.

Another objective of the present invention is to construct a damper apparatus which significantly dampens the noise of the movement of the air through the duct.

The damper of the present invention utilizes a main support member comprising an elongated rod. A frame constructed of thin, metal strapping is mounted on the rod with the exterior end of the frame being mounted on the outer end of the rod, and the interior end of the frame being mounted directly adjacent the inner end of the rod. Closely covering this frame is a cover constructed of either plastic or a fabric. The exterior end of the frame is adjustable a limited distance relative to the outer end of the rod. Similarly, the interior end of the frame is adjustable on the rod directly adjacent the inner end of the rod. This movement of the rod relative to the frame is so as to accomplish ease of installation of the damper apparatus within a duct. A spring is included at the interior end of the frame and at the inner end of the rod which functions to position the rod in the precisely installed position relative to the duct so that both ends of the rods slightly protrude exteriorly of the wall surface of the duct.

BRIEF DESCRIPTION OF THE DRAWINGS

FIG. 3 is a cross-sectional view taken along line 3—3 of FIG. 2; and

FIG. 4 is a cross-sectional view taken along line 4—4 of FIG. 3.

DETAIL DESCRIPTION OF THE PREFERRED EMBODIMENT

Figures 1, 2:
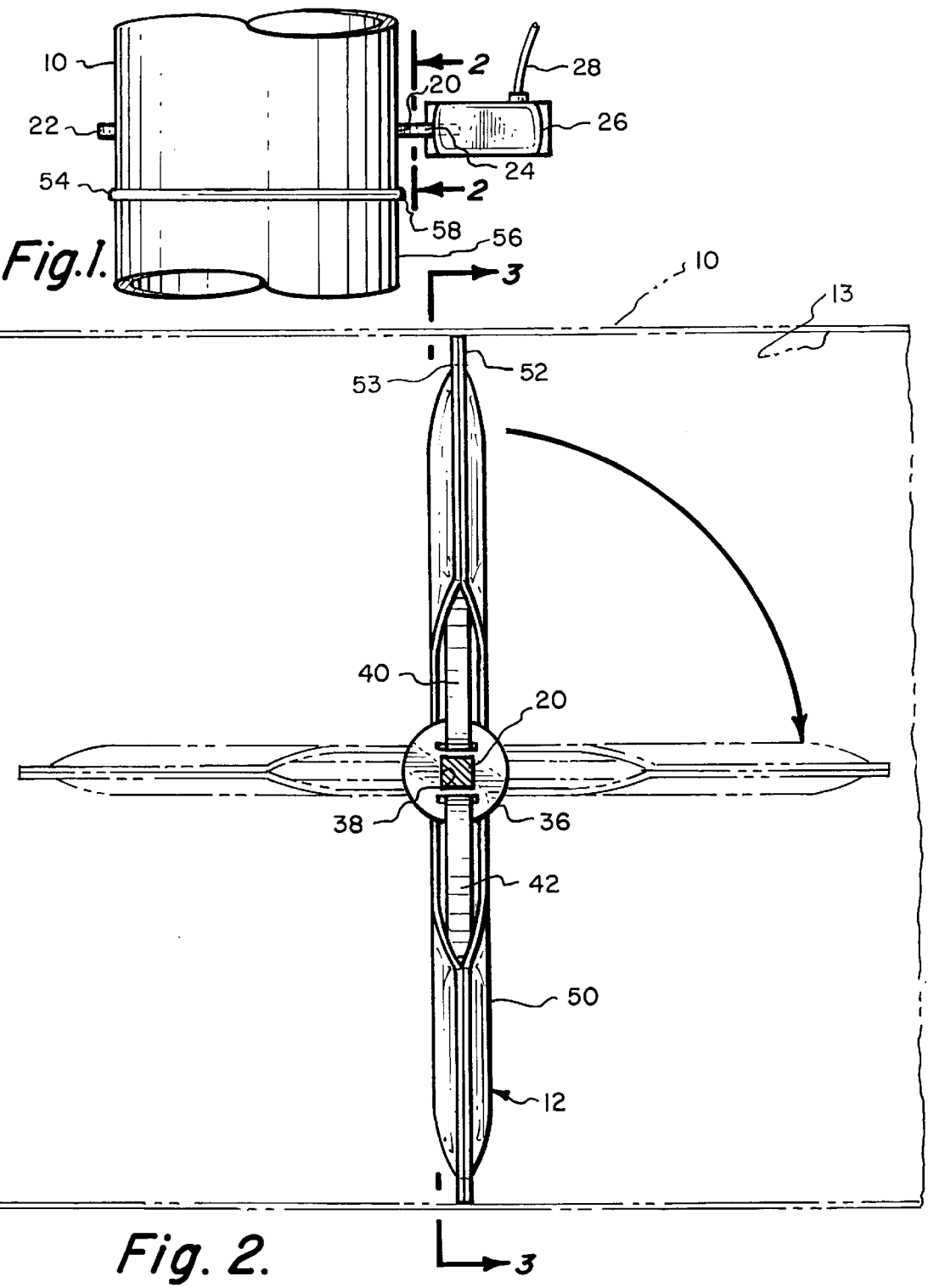
FIG. 1 is an exterior view of a section of a duct within which has been installed the damper apparatus of the present invention.
FIG. 2 is a view of the damper apparatus taken along line 2—2 of FIG. 1 with the duct now being shown in phantom lines so as to clearly observe the transverse, totally restrictive, position and the aligned minimally restrictive position of the airflow that passes by the damper apparatus.

Referring particularly to FIG. 1, there is shown a duct 10 with the duct 10 being shown in phantom lines in FIG. 2. The duct 10 has an internal chamber 13. The internal chamber 13 happens to be circular in transverse cross-section. However, it is to be considered to be within the scope of this invention that other than circular configurations could be employed such as hexagonal, octagonal and square. When circular, the diameter of the interior chamber 13 will normally be between four and twelve inches.

Referring particularly to FIG. 3, the duct 10 has formed therein an outer hole 14 and an inner hole 16. Generally, the outer hole 14 will be approximately one-half inch in diameter.

The inner hole 16 will normally be slightly larger, such as about three-quarters of an inch in diameter. The outer hole 14 and the inner hole 16 are diametrically in alignment relative to the internal chamber 13.

The main supporting component of the damper apparatus 12 of this invention is an elongated rod 20. Preferably, the elongated rod 20 would be of square configuration. A typical length for the elongated rod 20 would be about eleven and one-half inches if the installation is to occur in an eight inch diameter duct 10. If the installation is occurring in a twelve inch diameter duct 10, then the length of the elongated rod 20 would be about fifteen and one-half inches. Generally, a length of the elongated rod 20 of about three and one-half inch greater than the diameter of the duct 10 will be utilized. The width of the elongated rod will generally be about three-eights of an inch. The elongated rod 20 has an outer end 22 and an inner end 24. The inner end 24 can be connectable with an electric motor assembly 26 which is to be driven electrically by means of the electric cord 28. The electric motor assembly 26 is for the purpose of causing pivoting of the elongated rod 20.

An outer washer 30 is mounted on the outer end 22. The outer washer 30 is movable from the outermost edge of the outer end 22 to a first stop 32. The first stop 32 constitutes an enlargement, such as a protruding ridge, formed on the elongated rod 20. The washer 30 includes a hole 34 within which the elongated rod 20 is mounted in a close conforming manner and yet permits easy, sliding movement of the outer washer 30 on the elongated rod 20.

Also mounted on the elongated rod 20 is an inner washer 36. The inner washer 36 also has a hole 38 within which there is located the elongated rod 20 with the elongated rod 20 forming a close fitting relationship with the hole 38 but yet the inner washer 36 is capable of being freely slidable on the elongated rod 20 in the area of the inner end 24.

The interior end of a metallic, bendable strip 40 is mounted within an opening formed within the outer washer 30. The interior end of the bendable strip 40 is mounted within a hole formed within the inner washer 36. The strip 40 is normally to be constructed of a metallic material with a spring steel being preferable.

A similar such bendable strip 42 is mounted with its exterior end being similarly engaged with the outer washer 30, and its interior end being similarly engaged with the inner washer 36. The bendable strips 42 and 44 are located on opposite sides of the elongated rod 20 and are of such length that the strips 40 and 42 will essentially assume a substantially circular configuration with the outer washer 30 being located its normal distance from the inner washer 36. Surrounding the elongated rod 20, and located in abutting contact with the inner washer 36, is a coil spring 44. The outer end of the coil spring 44 abuts against a stop plate 46 which is mounted on the elongated rod 20. The stop plate 46 is to abut against a second stop 48 in the form of a protruding ridge formed on the elongated rod 20.

Covering of the frame composed of bendable strips 40 and 42 is a sheet material flexible, plastic or fabric cover 50. The cover 50 is formed of actually two separate cover members which are secured together by a sewn line 53 at the peripheral edge forming a seam 52. This seam 52, when the damper apparatus 12 is properly installed, is to be in abutting contact with the wall of the internal chamber 13 when the damper apparatus 12 is in the transversely located position within the internal chamber 13 as is shown in dotted lines in FIG. 2 and in solid lines in FIGS. 3 and 4.

The installation of the damper apparatus 12 of this invention within the internal chamber 13 of the duct 10 is as follows: The open end 54 of the duct 10 has not been connected to a duct 56 by the seam 58. Therefore, access into the internal chamber 13 is permitted through the open end 54. The user inserts the inner end 24 within the internal chamber 13 and causes the inner end to engage with the inner hole 16. The inner end 24 is permitted to extend two or three inches exteriorly of the wall surface of the duct 10. The user then proceeds to pivot the frame composed of bendable strips 40 and 42 which are covered with the cover 50 until the outer end 22 is to be located in alignment with the outer hole 14. In order to achieve this alignment, the user is to physically grasp the inner end 24 and pull such in an outward direction compressing of the coil spring 44. This will cause the outer end 22 to retract slightly relative to the outer washer 30 to where the outermost edge of the outer end 22 comes into a substantial alignment with the outer washer 30. This will provide the necessary clearance so as to locate the outer end 22 in direct alignment with the outer hole 14. When in this position, the user can then physically release the inner end 24 which, due to the biasing action of the coil spring 44, the outer end 22 will then be caused to protrude slightly from the wall of the duct 10, as is clearly shown in FIGS. 1 and 3 of the drawings. The damper apparatus 12 is now installed within the internal chamber 13 of the duct 10.

Normally, initially the seam 52 is positioned directly against the duct 10 which will locate the damper apparatus 12 in the position of totally closing off the airflow through the internal chamber 13. However, by pivoting of the elongated rod 20 as by grasping of the inner end 24 and turning of the elongated rod 20, the damper apparatus 12 can be located at any desired angular position to where at a ninety degrees displaced position, the damper apparatus 12 is located in alignment with the longitudinal center axis of the duct 10 with substantially none of the air being passed there through being restricted. By connecting of the inner end 24 to the electric motor assembly 26, the adjusting of the damper apparatus 12 can be accomplished automatically as by with a remote control (which is not shown). If the damper apparatus 12 has been mounted within the house, the homeowner can use the remote control to decrease or increase airflow within a particular room of the house.

Because of the using of the flexible plastic or fabric cover 50, the air that flows through the internal chamber 13 when it comes into contact with the cover 50, the sound of the air flowing through the internal chamber 13 is muted. There is not produced any high pitched shrill which is so common when utilizing of sheet metal dampers. Also, the rushing sound that is so common when air flows through a duct is also significantly muted. It is most desirable to have the airflow passing through the duct 10 to be as quiet as possible.

What is claimed is:

1. A damper apparatus which is to be transversely installed within an internal chamber of a gas conducting duct to restrict the flow of gas through the duct, said duct defining a tubular configuration in transverse cross section, said damper apparatus comprising;

an elongated rod having an outer end and an inner end;

a frame mounted on said elongated rod, said frame having an exterior end and an interior end, said exterior end being mounted on said elongated rod at said outer end, said interior end being mounted on said elongated rod directly adjacent said inner end, said frame assuming an expanded configuration which has a shape essentially identical to said tubular configuration of said duct in transverse cross-section; and a sheet material cover mounted on said frame, said cover substantially covering the entire said frame forming an enlarged shape, said enlarged shape substantially equalling in size said tubular configuration of said duct, said cover being flexible, said cover closely conforming about said frame, whereby said cover functions to dampen the sound of a gas as the gas flows past said damper apparatus.

2. The damper apparatus as defined in claim 1 wherein:
said frame comprising a pair of thin, bendable strips, said strips being located opposite each other in a facing relationship relative to said elongated rod.

3. The damper apparatus as defined in claim 1 wherein:
said duct having an interior wall surface, said cover being capable of closely conforming to said interior wall surface thereby substantially preventing the flow of gas past said damper apparatus when said damper apparatus is positioned precisely transverse within said internal chamber.

4. The damper apparatus as defined in claim 1 wherein:
said exterior end being movable relative to said elongated rod with movement toward said inner end being limited by a first stop.

5. The damper apparatus as defined in claim 1 wherein:
said interior end being movable relative to said elongated rod with movement toward said outer end being limited by a second stop.

6. The damper apparatus as defined in claim 5 wherein:
spring means mounted between said interior end and said second stop, said spring means exerting a constant bias on said damper apparatus to locate said elongated rod so that both said outer end and said inner end protrude exteriorly of said duct.

7. In combination with a fluid duct, said duct having a longitudinal center axis, said duct having a sidewall enclosing a gas conducting through passage, a damper apparatus to be mounted within said through passage, said damper apparatus comprising:

a first hole formed within said sidewall, a second hole formed within said sidewall, said first and second holes are transversely aligned relative to said longitudinal center axis;

an elongated rod having an outer end and an inner end;

a frame having a exterior end and an interior end, said frame being mounted on said elongated rod with said exterior end being located at said outer end and said interior end being located at said inner end, said frame assuming an expanded configuration which has a shape essentially identical to said gas conducting through passage in transverse cross-section; and a sheet material cover mounted on said frame, said cover substantially covering the entire said frame, said cover being flexible, said cover closely conforming about said frame, whereby said cover functions to dampen the sound of a gas as the gas flows past said damper apparatus.

8. The damper apparatus as defined in claim 7 wherein:
said duct having an interior wall surface, said cover being capable of closely conforming to said interior wall surface thereby substantially preventing the flow of gas past said damper apparatus when said damper apparatus is positioned precisely transverse within said internal chamber.

9. The damper apparatus as defined in claim 7 wherein:
said exterior end being movable relative to said elongated rod, with movement toward said inner end being limited by a first stop.

10. The damper apparatus as defined in claim 7 wherein:
said interior end being movable relative to said elongated rod with movement toward said outer end being limited by a second stop.

11. The damper apparatus as defined in claim 10 wherein:
spring means mounted between said interior end and said second stop, said spring means exerting a constant bias on said damper apparatus to locate said elongated rod so that both said outer end and said inner end protrude exteriorly of said duct.

* * * * *